United States Patent
Correia et al.

(10) Patent No.: US 7,077,232 B2
(45) Date of Patent: Jul. 18, 2006

(54) OPTIMUM STEERING SYSTEM GEOMETRY

(75) Inventors: Egidio Miguel Gomes Correia, Sao Paulo (BR); Marcos Fabio Colombini, Sao Paulo (BR)

(73) Assignee: Meritor do Brasil, Ltda. (BR)

( * ) Notice: Subject to any disclaimer, the term of this patent is extended or adjusted under 35 U.S.C. 154(b) by 0 days.

(21) Appl. No.: 10/415,572

(22) PCT Filed: Jan. 18, 2001

(86) PCT No.: PCT/BR01/00006

§ 371 (c)(1),
(2), (4) Date: Apr. 30, 2003

(87) PCT Pub. No.: WO02/38433

PCT Pub. Date: May 16, 2002

(65) Prior Publication Data
US 2003/0234136 A1    Dec. 25, 2003

(30) Foreign Application Priority Data
Nov. 13, 2000 (BR) ................................. 0005595

(51) Int. Cl.
*B62D 17/00* (2006.01)
(52) U.S. Cl. .............. 180/410; 180/411; 180/413; 701/41; 701/42
(58) Field of Classification Search ........ 180/408–414; 701/41–42
See application file for complete search history.

(56) References Cited

U.S. PATENT DOCUMENTS

| 5,141,069 | A | 8/1992 | Yasui |
| 5,143,400 | A * | 9/1992 | Miller et al. ............... 180/413 |
| 6,272,409 | B1 | 8/2001 | Elwood |
| 6,363,305 | B1 * | 3/2002 | Kaufmann et al. ......... 180/403 |

FOREIGN PATENT DOCUMENTS

| DE | 199 45 658 A1 | 3/2000 |
| FR | 2 684 606 A1 | 6/1993 |

OTHER PUBLICATIONS
International Search Report, dated Sep. 4, 2001.

* cited by examiner

*Primary Examiner*—Lesley D. Morris
*Assistant Examiner*—Matthew Luby
(74) *Attorney, Agent, or Firm*—Carlson, Gaskey & Olds

(57) ABSTRACT

An improved system for achieving optimum steering angles for wheels incorporates a sensor which senses the steering angle of a first wheel. The sensed angle is sent to a control which then determines the optimum angle for the other steered wheel based upon known formulas. The optimum angle is determined, and an adjustment structure associated with the tie rod then drives the second wheel to achieve the optimum steered angle.

6 Claims, 2 Drawing Sheets

OPTIMUM STEERING SYSTEM GEOMETRY

BACKGROUND OF THE INVENTION

This invention relates to the adjustment of the steering angle of one of the two wheels on a vehicle to obtain an optimum steering angle for the combination of the two wheels.

Vehicles typically incorporate two axles spaced along a center line of the chassis of the vehicle. Typically, the front axle includes steerable wheels, and the rear axle includes non-steerable wheels. It is a known challenge to the designer of steering systems that one of the two wheels will often be subject to scrubbing during a turn. This results in high tire wear. Typically, scrubbing occurs since the radius upon which an inner of the two wheels will travel is less than the radius upon which the outer of the two wheels will travel.

This basic arrangement is often called an Ackerman geometry steering system. With Ackerman geometry steering systems, it is known that there is only one turning angle combination for the two wheels which will result in an optimum overall steering to minimize scrubbing.

The optimum angle is one in which the projected axes of the two turned steering wheels intersect each other along a projection of the rear axle axis. In such a combination, the two steered wheels will have a pure rolling motion, and scrubbing will be reduced if not eliminated. For all other turning angles, there is an error between the angle of one of the steered wheels and the optimum value. This error causes undesirably high tire scrubbing and resultant tire wear.

SUMMARY OF THE INVENTION

In a disclosed embodiment of this invention, the steering angle of one of the two wheels is adjusted to approximate the optimum steering angle, given the angle of the other of the two wheels. The idealized relative angles can be determined by a formula utilizing the cotangents of the two steered angles, and relating them to the distance between the two steered wheels, and the distance between the front and rear axles.

In a disclosed embodiment of this invention a method and apparatus adjusts the length of the tie rod to move one of the two steered wheels based upon the position of the other of the two steered wheels. In one application the tie rod adjustment structure is provided by a hydraulic cylinder. In a second embodiment, an electric motor is provided with a ball and runner nut assembly for adjusting the position of the second wheel.

These and other features of the present invention can be best understood from the following specification and drawings, the following of which is a brief description.

DETAILED DESCRIPTION OF A PREFERRED EMBODIMENT

Figure 1:
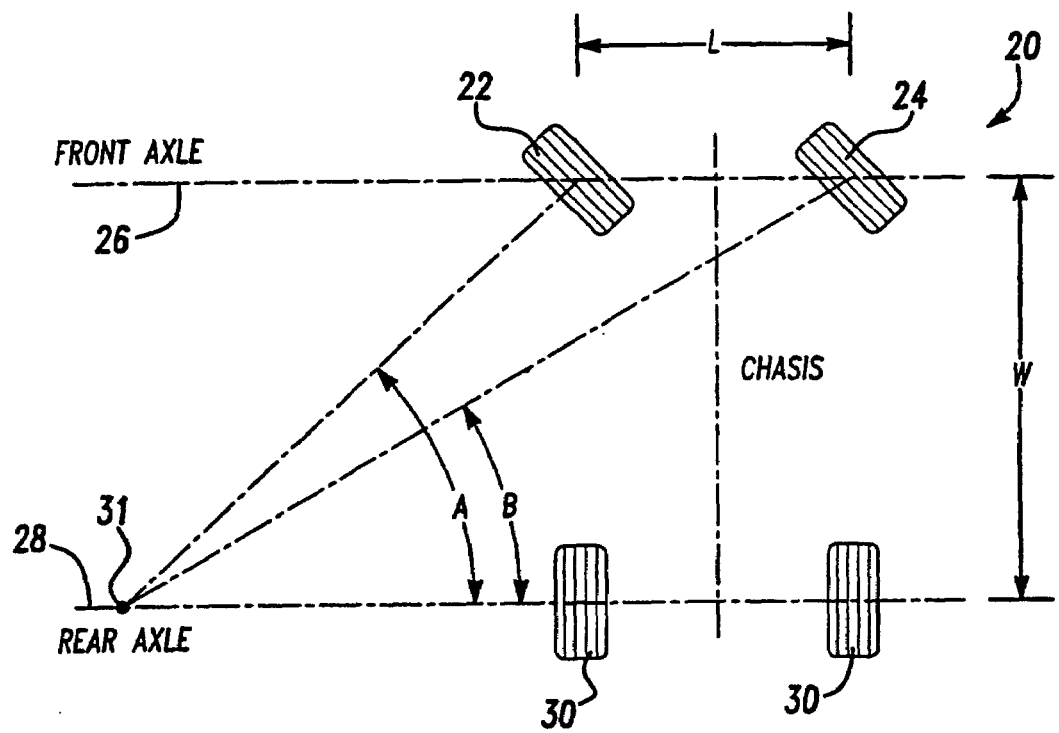
FIG. 1 schematically shows the geometric concerns when analyzing optimum steering angles.

FIG. 1 shows the geometric relationships in a vehicle steering system 20. As shown, front steered wheels 22 and 24 are mounted on a front axle 26. A rear axle 28 is spaced from the front axle 26 by a distance W, and mounts two rear wheels 30. As shown, the steered wheels 22 and 24 are spaced from each other by a distance L. As also shown, during steering, the, wheel 22 defines a projected angle A with the rear axle 28 while the wheel 24 defines a projected angle B with the rear axle 28. When these two projected angles meet at a single point 31 on the rear axle 28, then there is no error, and tire scrubbing will be minimized. The further spaced two projected axes are on the axis of rear axle 28, the greater the tire scrubbing that will occur.

The present invention is directed to reducing the amount of tire scrubbing. It is known that the idealized combination of angles A and B necessary to meet at a point 31 on the rear axle 28 can be defined by the following equation:

$$\cot B - \cot A = L/W$$

For any other combination of turning angles, there will be an error.

The present invention utilizes this relationship to determine an idealized angle B for one of the two wheels.

Figure 2:
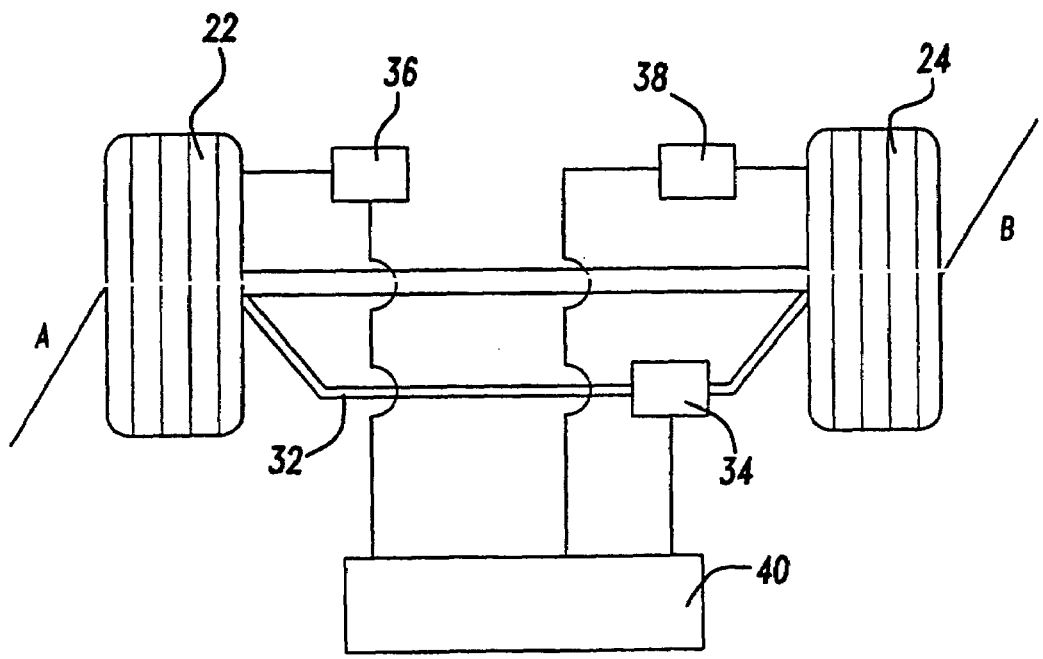
FIG. 2 is a schematic view of an inventive system.

The system such as shown in FIG. 2 incorporates a tie rod 32 connecting the wheels 22 and 24. The tie rod 32 is generally as utilized on standard vehicles; however, it is also provided with an inventive adjustment structure 34. The adjustment structure 34 allows adjustment of the length of the tie rod 32, and thus adjustment of the angle B for the wheel 24.

A sensor 36 monitors the angle A of the steered wheel 22. A second sensor 38 determines and monitors the angle B of the wheel 24. A microprocessor, or other type of controller 40 receives a signal indicative of the angle A by sensor 36. The factors L and W are known for the particular vehicle. Thus, based upon the sensed angle A, the microprocessor 40 can calculate an idealized angle B during a turn. The adjustment structure 34 is then actuated to turn the wheel 24 until the idealized angle B is achieved. The sensor 38 is utilized to provide feedback during this adjustment.

The above-described system is capable of quickly achieving the idealized angles. In other systems which may come within the scope of this invention, the system may be less precise in achieving a desired angle, but still change the angle B such that the error in the projected axes is at least reduced to reduce tire scrubbing. However, obviously the present invention most preferably achieves the exact optimum angle B.

Figure 3:
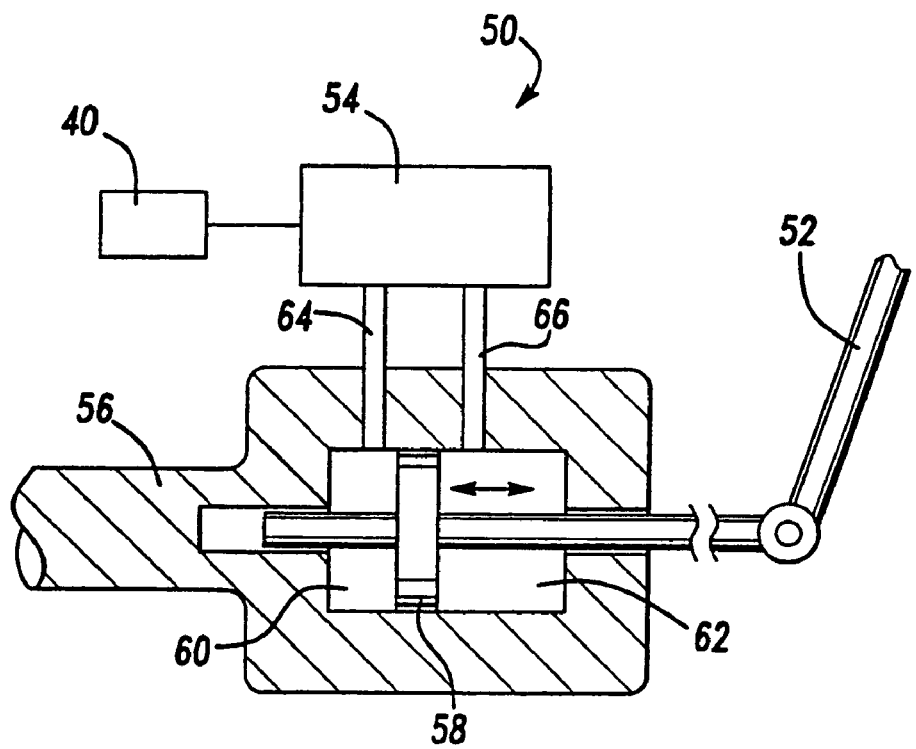
FIG. 3 shows a first embodiment tie rod adjustment structure.

FIG. 3 shows a first embodiment 50 wherein a tie rod connecting portion 52 is connected to the wheel 24. A hydraulic fluid supply 54 is connected with the microprocessor control 40. Side 56 extends to the opposed wheel 22, and provides the remainder of the tie rod. A piston 58 is received within a cylinder having chambers 60 and 62. Supply line 64 and 66 communicate hydraulic fluid from the supply 54 to move the piston 58, and hence the part 52. As part 52 moves, the angle B of the wheel 24 is adjusted, as desired.

Figure 4:
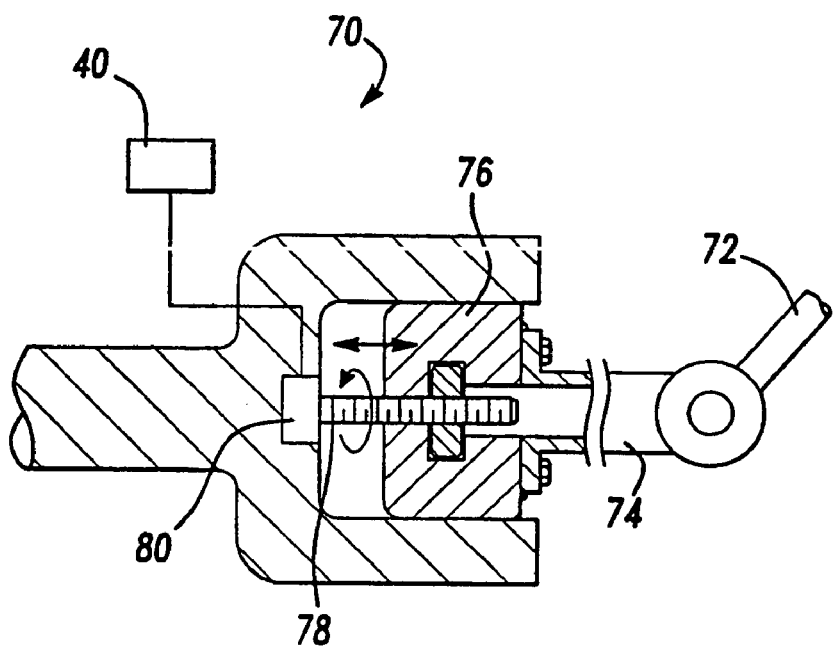
FIG. 4 shows a second embodiment tie rod adjustment structure.

FIG. 4 shows a second embodiment 70 wherein the part 72 connected to the wheel 24 is associated with a part 74 connected to move with a runner nut 76. Runner nut 76 is driven by a screw thread 78. Screw thread 78 is driven by an electric motor 80 which is in turn controlled by the control 40. As is known, when motor 80 drives thread 78 to rotate, nut 76 is constrained against rotation, but allowed to move axially. The runner nut 76 may be constrained against rotation by its connection to the part 74, or by any other appropriate structure. As the nut 76 moves axially it changes the angle of the wheel 24 through its connection to the parts 72 and 74.

Other adjustment structure would come with the scope of this invention.

Although preferred embodiments of this invention have been disclosed, it should be understood that various modifications would come within the scope of this invention. For that reason, the following claims should be studied to determine the true scope and content of this invention.

Although a preferred embodiment of this invention has been disclosed, a worker in this art would recognize that certain modifications would come within the scope of this invention. For that reason, the following claims should be studied to determine the true scope and content of this invention.

The invention claimed is:

1. A vehicle steering system comprising:
   a first and second steered wheels spaced apart from each other;
   a sensor for sensing an angle of said first steered wheel, and
   a control for adjusting an angle of said second steered wheel based upon said angle sensed by said sensor;
   said control calculates an optimum angle for said second steered wheel based upon said angle of said first steered wheel sensed by said sensor; and
   an angle of said second steered wheel is monitored and used as feedback for adjustment of said second steered wheel.

2. A vehicle steering system as recited in claim 1, wherein an adjustment structure for adjusting said angle of said second steered wheel is provided in a tie rod which interconnects said first and said second steered wheels.

3. A vehicle steering system as recited in claim 1, wherein said angle of said first steered wheel sensed by said sensor is defined by an angle A, and said angle of said second steered wheel is defined by an angle B, a distance along an axle interconnecting said first and second steered wheels is defined by a distance L, and a distance to a rear axle from an axle mounting said first and said second steered wheels is defined by a distance W, and said optimum angle of said second steered wheel is defined by the following equation:

$$\cot B - \cot A = L/W.$$

4. A vehicle steering system as recited in claim 2, wherein said adjustment structure incorporates a hydraulic cylinder which selectively receives hydraulic fluid to move a piston and adjust said angle of said second steered wheel.

5. A vehicle steering system as recited in claim 2, wherein said adjustment structure incorporates an electric motor which drives an adjustment part to adjust said angle of said second steered wheel.

6. A method of adjusting the steered wheels of a vehicle comprising the steps of:
   1) providing first and second steered wheels, sensing an angle of the first steered wheel during a turn, and determining a desired adjustment for an angle of said second steered wheel to achieve a more optimum steering relationship;
   2) adjusting a position of said second steered wheel based upon said determination of step 1; and
   3) including sensing the angle of the second steered wheel to provide a sensed angle and using the sensed angle as feedback to control the adjustment of step 2).

* * * * *